UNITED STATES PATENT OFFICE.

WILLIAM BRANTINGHAM GILES, OF CANONBURY, N., COUNTY OF MIDDLESEX, AND ARTHUR SHEARER, OF WEST HAM, COUNTY OF ESSEX, ENGLAND.

MANUFACTURE OF PHOSPHORIC ACID.

SPECIFICATION forming part of Letters Patent No. 393,428, dated November 27, 1888.

Application filed July 12, 1887. Serial No. 244,094. (No specimens.) Patented in England January 16, 1886, No. 715.

*To all whom it may concern:*

Be it known that we, WILLIAM BRANTINGHAM GILES, residing at 76 St. Paul's Road, Canonbury, N., in the county of Middlesex, England, and ARTHUR SHEARER, residing at 8 Hamfrith Road, in the borough of West Ham, in the county of Essex, England, subjects of the Queen of Great Britain, have invented certain new and useful Improvements in the Manufacture of Phosphoric Acid, (for which we have received Letters Patent in Great Britain, No. 715, dated January 16, 1886,) of which the following is a specification.

Up to the present time phosphoric acid of commerce has been produced either by the oxidation of phosphorus or by treating various phosphates with sulphuric acid or other bodies for the purpose of setting free the phosphoric acid or by heating phosphate of ammonium. In the former process—that is to say, the oxidation of phosphorus—there is trouble and expense in preparing the phosphorus in addition to the considerable labor and outlay which are entailed in thoroughly oxidizing it and freeing the resulting acid from arsenic and other impurities, which greatly enhance the cost of the phosphoric acid, and, on the other hand, the acid which is prepared from bone-ashes, various forms of phosphate of lime, or other phosphates by means of sulphuric acid or other reagents always contains certain impurities—such as magnesia, soda, iron, alumina, and the like—which differ in amount and kind according the source of the phosphate employed and the mode of treatment adopted. These impurities render the acid so made unfit for use when a pure acid is required—as in pharmacy, for instance. Now, we have discovered that at an elevated temperature—*i. e.*, from a dull-red heat to bright redness—phosphoric acid distills freely in presence of a current of steam, air, or of hydrochloric acid, and this affords a most effectual means whereby impure phosphoric acid or highly-acid phosphates may be freed from impurities—such as lime, magnesia, iron, or other bases or their compounds—and also from foreign volatile and fixed acids.

In carrying out the said invention we take any suitable phosphatic material—such as phosphate of lime in any form, phosphate of lead, phosphate of alumina or iron, or the phosphoric slag which is produced in iron or steel making—and, having preferably treated any of these materials so as to separate the greater part of the bases, so as to obtain an impure phosphoric acid or a highly-acid phosphate, as is understood by chemists, we concentrate the acid solution to a sirupy or pasty condition, and then, placing it in a retort or other suitable vessel, we pass over it a current of steam, (superheated or not,) or a current of air, or of hydrochloric acid, or of any of these conjointly, preferring, however, to employ a small amount of steam only, sufficient to keep the distillate fluid from blocking up the condensing apparatus. At the same time the material in the operating-vessel is maintained at an elevated temperature by means of a fire or gas-furnace. Usually we employ a strong red heat.

We find it advisable to maintain as perfect a vacuum as possible in the condensing apparatus, as the operation is greatly helped and the heat required is much less. If air alone be employed, the distilling-acid is principally monohydric phosphate, ($PO_3H$,) commonly known as "metaphosphoric acid", and as this body is only fluid at a high temperature a special construction of condensing apparatus is necessary.

Instead of first separating the phosphoric acid from the bases, as we have just described, we may effect this in the distilling-vessel itself by introducing with the phosphatic material silica, sand, or silicious material, sulphuric acid, or any other substance that will set the phosphoric acid free during the process of distillation.

Should any volatile impurities—such as hydrochloric acid, hydrofluoric acid, or sulphuric acid—be present, these bodies distill over before the phosphoric acid and are caught in a separate condenser, the magnesia, lime, iron, and alumina and other fixed impurities or residues remaining in the distilling-vessels in the form of phosphates or silicates.

Having now particularly described and ascertained the nature of our said invention and in what manner the same is to be performed, we declare that what we claim is—

1. The hereinbefore-described process of separating phosphoric acid from impurities, consisting in distilling or volatilizing impure phosphoric acid at an elevated temperature (say a red heat) in the presence of a current of air, steam, or hydrochloric acid and condensing the distillate, substantially as set forth.

2. The hereinbefore-described process of separating phosphoric acid from impurities, consisting in distilling or volatilizing impure phosphoric acid at an elevated temperature, (say a red heat,) subjecting the distillate to the action of a current of steam, air, or hydrochloric acid, and condensing the distillate in a partial vacuum, substantially as set forth.

3. The hereinbefore-described process of separating phosphoric acid from impurities, consisting in partially separating phosphoric acid from its base, concentrating the acid solution thus obtained to a pasty or sirupy condition, distilling or volatilizing this sirup at an elevated temperature (say a red heat) in the presence of air, steam, or hydrochloric acid, and condensing the distillate, substantially as set forth.

4. The hereinbefore-described process of separating phosphoric acid from impurities, consisting in distilling phosphatic material at an elevated temperature (say a red heat) in the presence of sulphuric acid or other substance that will set the phosphoric acid free, subjecting the distillate to the action of air, steam, or hydrochloric acid, and then condensing the product, substantially as set forth.

WILLIAM BRANTINGHAM GILES.
ARTHUR SHEARER.

Witnesses:
  THOMAS SWIRE MUSGRAVE,
  JOHN ALFRED DENNISON.